United States Patent [19]

Selby et al.

[11] Patent Number: 5,736,641
[45] Date of Patent: Apr. 7, 1998

[54] CAPACITANCE DECODED ACCELEROMETER

[75] Inventors: Ronald Kenneth Selby, Burton; Michael John Schnars, Clarkston; Jerry Alan Gohl, Flushing; James Edward Nelson, North Branch; Raymond Lippmann, Ann Arbor, all of Mich.

[73] Assignee: Delco Electronics Corporation, Kokomo, Ind.

[21] Appl. No.: 714,735

[22] Filed: Sep. 16, 1996

[51] Int. Cl.⁶ .................................................. G01P 15/125
[52] U.S. Cl. ............................ 73/514.32; 73/510; 73/493
[58] Field of Search ............................. 73/514.32, 431, 73/493, 494, 514.01, 510, 514.16; 324/660

[56] References Cited

U.S. PATENT DOCUMENTS

| | | | |
|---|---|---|---|
| 4,038,876 | 8/1977 | Morris | 73/510 |
| 4,711,125 | 12/1987 | Morrison | 73/510 |
| 4,963,829 | 10/1990 | Wereb | 324/660 |
| 5,172,039 | 12/1992 | Owens | 324/660 |

*Primary Examiner*—Christine K. Oda
*Attorney, Agent, or Firm*—Jimmy L. Funke

[57] ABSTRACT

A circuit board has an arcuate array of conductor segments each subject to a digital waveform differing in phase for the various segments, and a concentric pickup conductor. A rotary encoder disk has a conductive pattern which sums and couples the waveforms from selected segments, depending on rotary position, to the pickup conductor. A synchronous phase detector generates a phase signal from the summed waveforms and the zero crossing of the phase signal is detected. A counter develops count signals used to generate the digital waveforms. The count signals are input to a latch which is clocked at the zero crossing point to latch the count value which is a digital measure of the encoder angle. Two encoders mounted on orthogonal horizontal axes are used as an accelerometer or attitude sensor. Each disk is eccentrically weighted to seek a position vertically below the axis to serve as an attitude sensor when the unit is stationary. When the unit is subject to horizontal acceleration the disks rotate from the vertical position to render acceleration readings.

13 Claims, 9 Drawing Sheets

CAPACITANCE DECODED ACCELEROMETER

FIELD OF THE INVENTION

This invention relates to an accelerometer and particularly to an accelerometer having a digital output.

BACKGROUND OF THE INVENTION

Accelerometers are useful in automotive vehicles and in other applications for example as impact sensors or as attitude sensors. In the absence of any horizontal acceleration of the vehicle (the vehicle is stationary), only the acceleration due to gravity is present, so that by sensing that acceleration the vertical axis is established and the attitude of the vehicle can be determined. The attitude is useful in determining the safe positioning of an off-the-road vehicle, or to help level a recreational vehicle. A measure of vehicle acceleration is useful in the control of trailer brakes and in sensing crashes for the control of supplemental restraints. Either attitude or acceleration sensing can be used in security systems which detect vehicle tampering or theft.

Commonly, such measurements are made by analog sensors. Analog sensors produce signals having limited accuracy and are subject to noise or interference when transmitted from a sensor to a utilization device. Also analog outputs require conversion to digital format for use in computers or other digital devices. It is preferred to use an accelerometer with a digital output. It is also desired that such a device have low cost and high resolution.

SUMMARY OF THE INVENTION

It is therefore an object of the invention to obtain digital acceleration data at low cost. It is another object to obtain high resolution in such data. A further object is to measure attitude of a vehicle or other object with a digital accelerometer.

Two rotary sensors are mounted on a housing for rotation about two orthogonal axes. Each sensor comprises a rotary capacitive encoder which accurately measures the rotation of a rotor about one of the axes, and the rotor is weighted to attain a vertical position due to gravity in the absence of a horizontal acceleration, and to move from vertical when horizontal acceleration is imposed. In either case the encoder digitally measures the rotor positions to provide an acceleration signal or display in the presence of a horizontal acceleration component, and otherwise will yield an attitude measure.

BRIEF DESCRIPTION OF THE DRAWINGS

The above and other advantages of the invention will become more apparent from the following description taken in conjunction with the accompanying drawings wherein like references refer to like parts and wherein:

FIG. 1b is a cross section of the accelerometer taken along line b—b of FIG. 1a;

FIG. 10 is a circuit for the two-axis accelerometer of FIG. 1a;

FIG. 11 is a diagram of an attitude sensor with a display; and

FIG. 12 is a diagram of an accelerometer coupled to a controller.

DESCRIPTION OF THE INVENTION

Figure 1A:
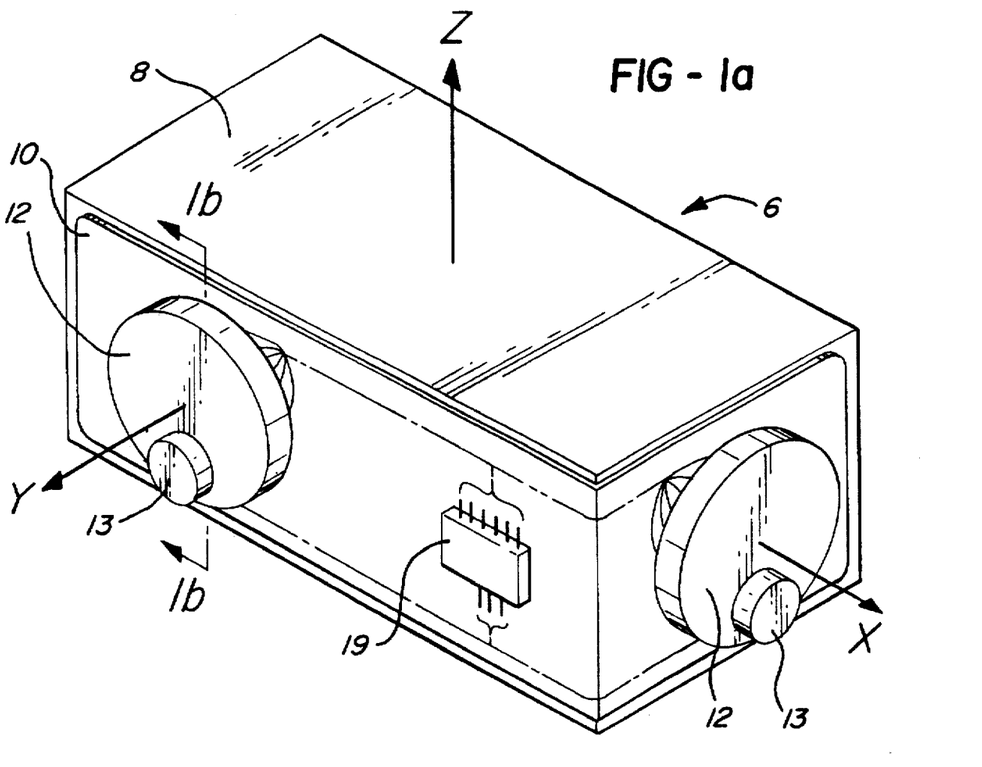
FIG. 1a is a view of an accelerometer according to the invention.
Figure 1B:
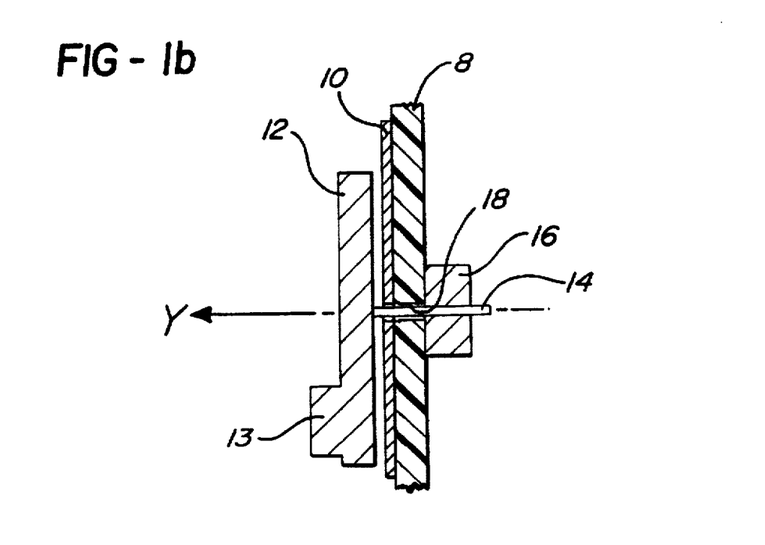

Referring to FIGS. 1a and 1b, a rotary capacitively coupled accelerometer 6 comprises a rectangular housing 8 nominally oriented with its faces normal to a vertical z axis and x and y axes in a horizontal plane. A flexible printed circuit or a circuit board 10 covers two faces of the housing and two rotary disks or rotors 12 are mounted on those faces for rotation about the x and y axes, respectively. Each disk has an eccentric inertial mass 13 such that the disks are oriented according to the acceleration on the housing to thereby serve as the sensor element of an accelerometer. In the special case of a stationary housing (thus no horizontal acceleration) the acceleration due to gravity pulls the mass into vertical alignment with the respective axis so that the accelerometer becomes an attitude sensor. The rotary disks 12, which are also circuit boards, are held by shafts 14 which freely rotate in bearings 16 in the housing 8 and which extend through holes 18 in the housing and the circuit board 10. To produce signals representing the position of the disks, conductive patterns on the board 10 and disks are capacitively coupled according to disk angular position, and excitation signals are applied to the conductive patterns. The resultant signals are analyzed to determine the angular position. An integrated circuit 19 containing the electronic circuits discussed below is mounted on the circuit board 10 to supply the excitation signals and to perform the analysis.

Figure 2:
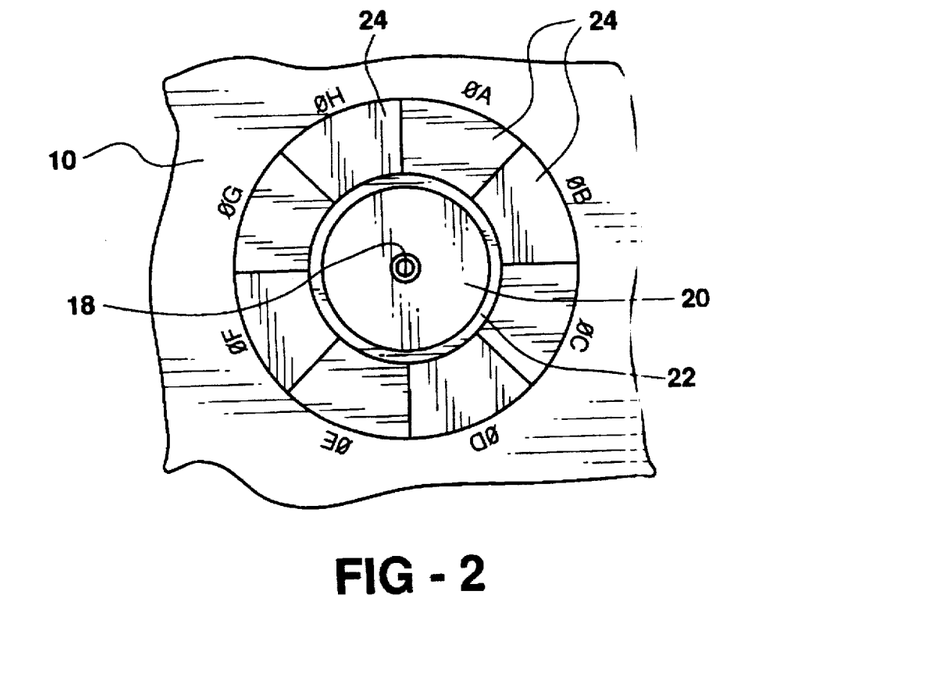
FIG. 2 is a front view of the circuit board of the encoder of FIG. 1.

FIG. 2 shows the conductive pattern applied to the circuit board 10. It includes a central pickup pad 20 surrounding the hole 18, an annular shield 22 around the pickup pad, and a circular array of segments 24 surrounding the shield. The shield 22 prevents capacitive coupling between the edges of the pickup pad 20 and the edges of the segments 24. Each of the segments 20 is designated as ØA–ØE according to the phase of its respective excitation signal. In this example eight segments are used.

Figure 3:
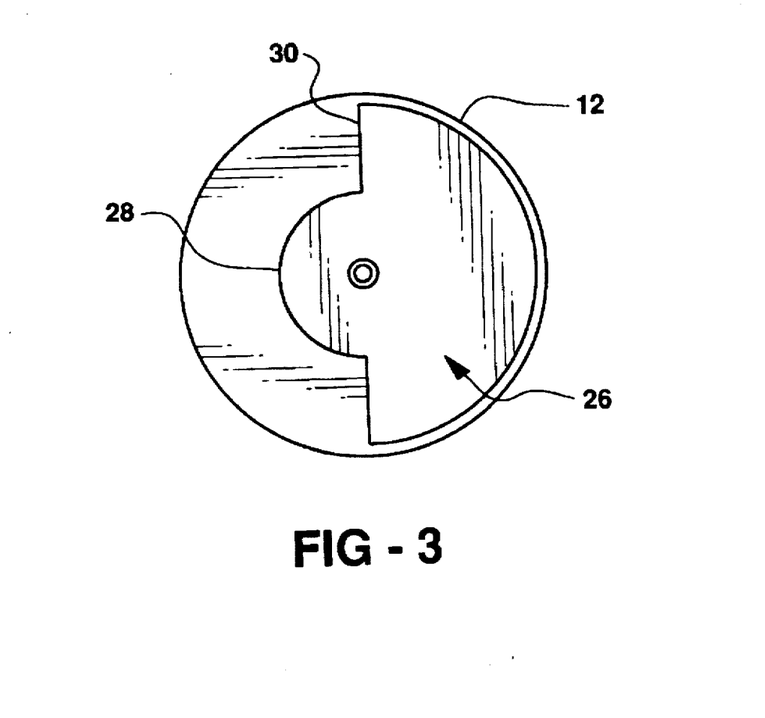
FIG. 3 is a rear view of the encoder disk of the encoder of FIG. 1.

The conductive pattern 26 on the disk 12 is an encoder pattern as shown in FIG. 3. It has a center circular portion 28 surrounding the shaft 14 and directly opposed to the pickup pad 20, and an outer portion 30 extending around half the disk and overlying half the segment array. In one position of the disk the outer portion will align with the segments ØA–ØD, and if rotated slightly, it will align with ØB–ØD and only portions of segments ØA and ØE, and so forth. The disk 12 is mounted sufficiently close to the circuit board 10 to capacitively couple the encoder pattern to the pickup pad and the segment array. Excitation signals imposed on the segments are coupled to the encoder pattern in proportion to the extent that any segment is aligned with or overlaps the encoder pattern. These coupled signal are summed on the encoder and coupled to the pickup pad 20.

By selecting suitable excitation signals, the summed signal on the pickup pad will reflect the position of the rotor as a phase angle. This arrangement of capacitively coupled conductors 20–26 on the disk and on the circuit board comprises a rotary sensor 32.

Figure 4:
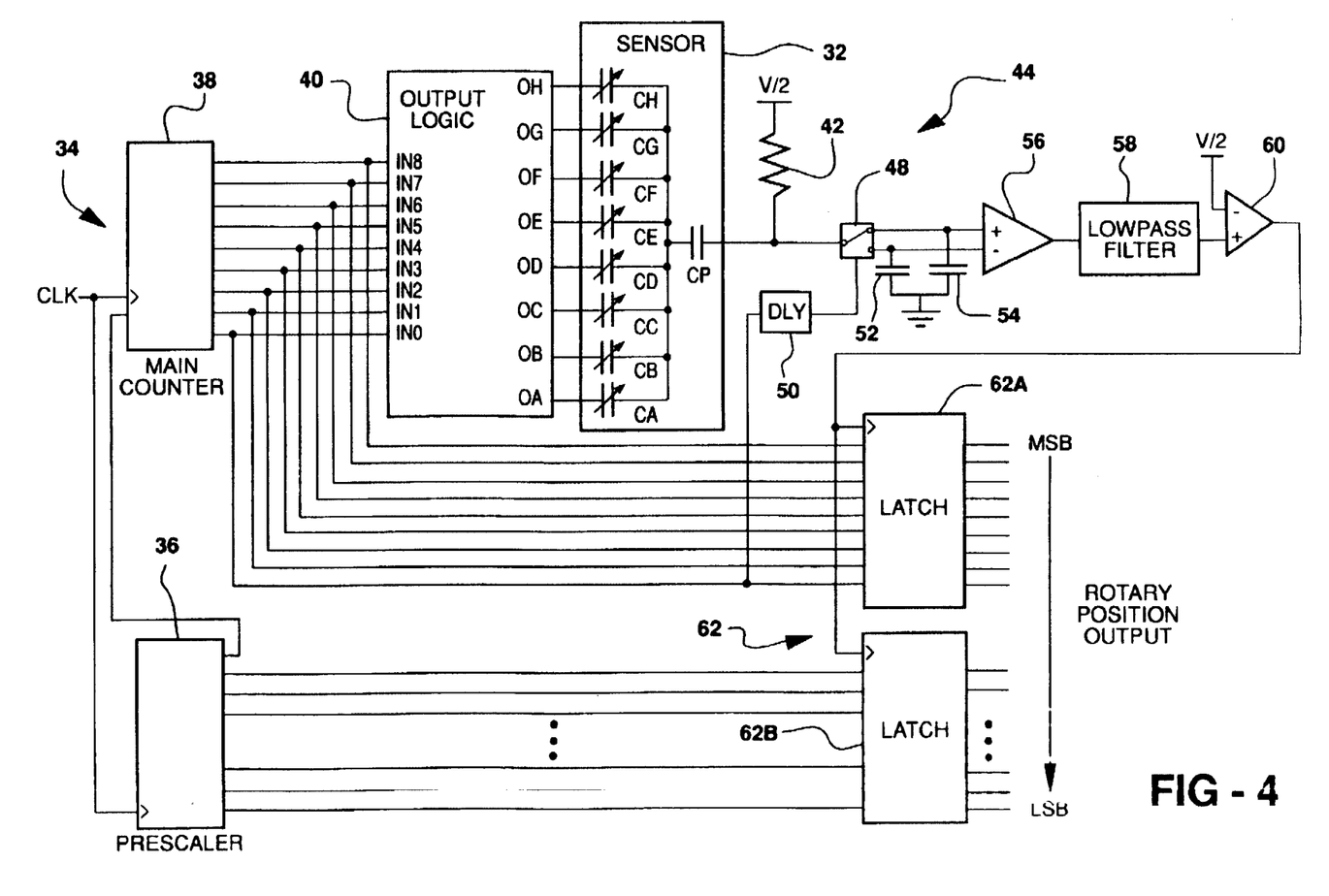
FIG. 4 is a schematic diagram of an electronic circuit for the encoder of FIG. 1.
Figure 5A:
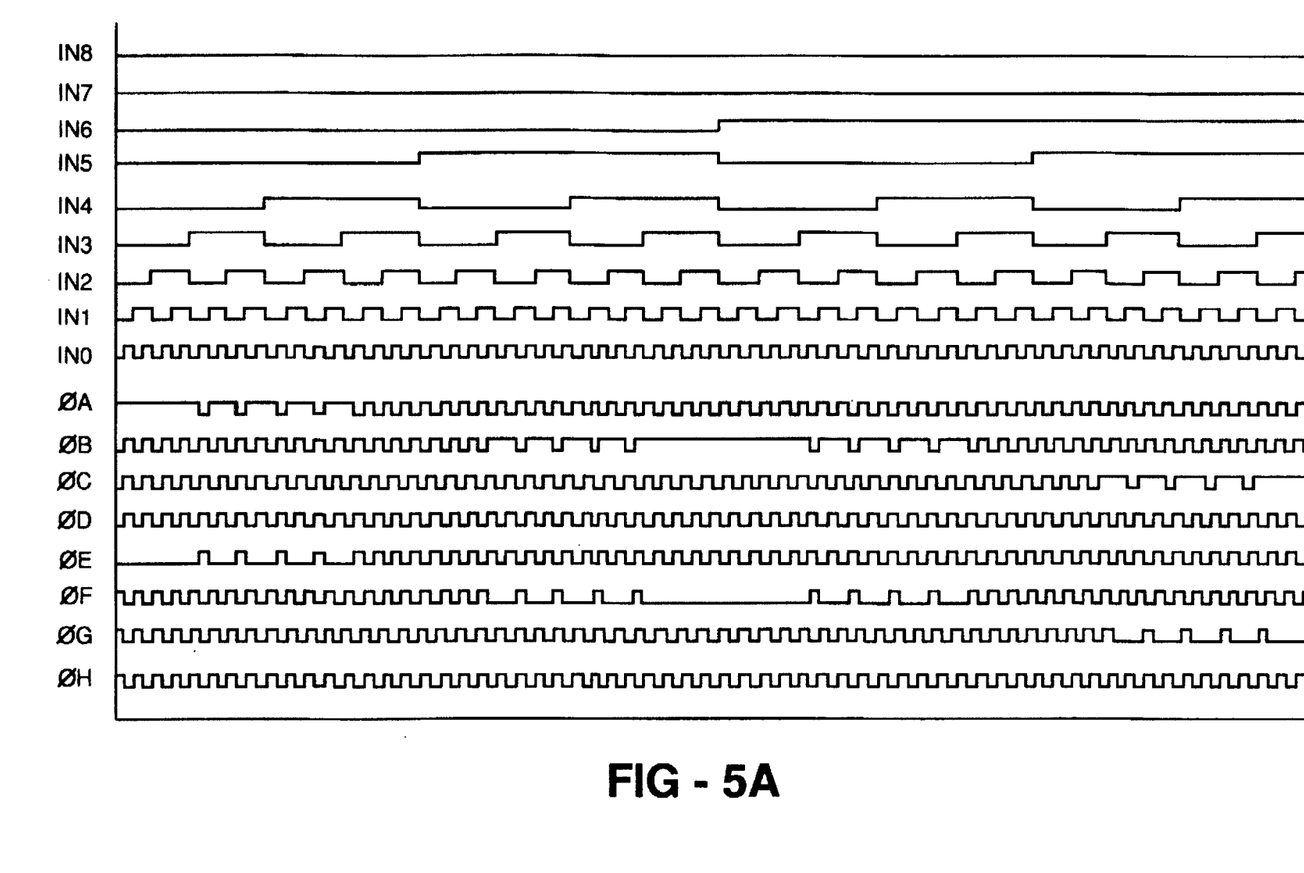
FIGS. 5A and 5B are clocking and driving waveforms used in the circuit of FIG. 4.
Figure 5B:
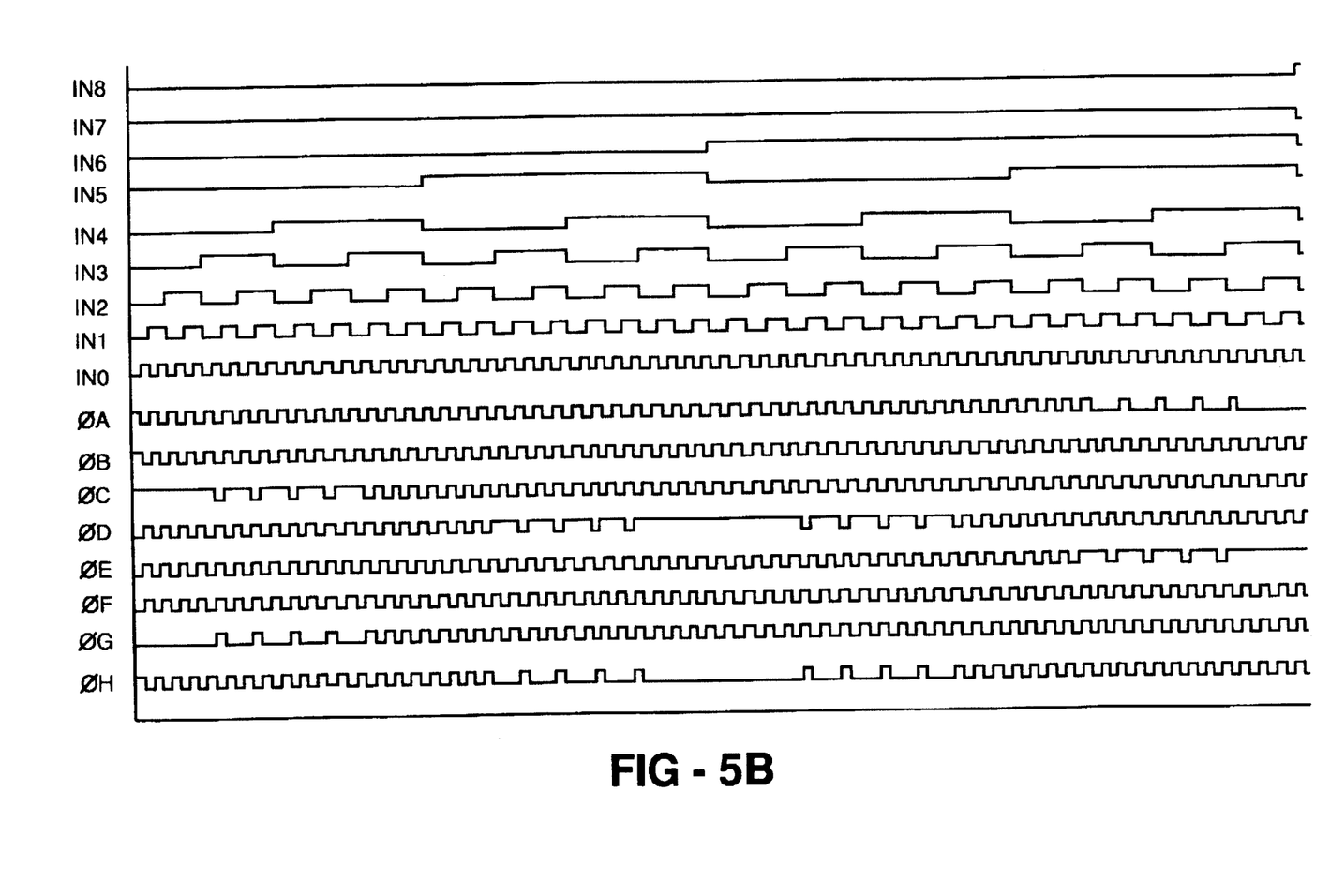

The circuit which drives and detects this sensor 32 is shown in FIG. 4. A counter 34 comprising a prescaler 36 and a main counter 38 is clocked by a clock signal which causes the prescaler to count every clock pulse and issue a carry signal which is coupled to a clock enable pin of the main counter 38. Thus the main counter is clocked once for each complete cycle of the prescaler. The main counter is preferably a 9 bit counter and its outputs are coupled to pins IN0 to IN8 of a logic circuit 40. The outputs ØA–ØH of the output logic are digital waveforms which are identical but differing in phase; each signal is delayed by 64 counts of the main counter from an adjacent signal. For example, ØB begins its sequence 64 counts after ØA begins its sequence. The entire sequence repeats for each waveform every 512 counts of the main counter. These outputs along with the inputs IN0–IN8 are shown in FIGS. 5A and 5B which cover one half of a complete cycle. Thus IN8 remains low until the end of FIG. 5B and then remains high for the other half of the main counter cycle, not shown. The signal IN0 is the base count of the main counter 38 and comprises a continuous stream of high frequency digital pulses.

Each of the output signals ØA–ØH comprises streams of high frequency pulses interrupted by a group of four pulses at half the main counter frequency, a break lasting for eight main counter pulses, and resuming with another four lower frequency pulses. The phase of the pulses changes after each break. For example, in FIG. 5A ØB is initially in phase with the main counter signal IN0 and after the break it is in inverse phase with IN0. The signals ØE–ØH are the logical inverses of ØA–ØD, respectively. The waveform sequences appear to be very complex but they are easily derived from the main counter outputs with a small number of gates.

Referring again to FIG. 4, the waveforms ØA–ØH output from the logic circuit are each coupled to one of the segments 24 which, along with the encoder pattern, comprises one of the capacitors CA–CH. The pickup pad 20 and the encoder pattern 26 comprise another capacitor CP which couples the summed signals out of the sensor 32. That output is coupled to V/2 via a resistor 42 and to a synchronous detector 44. The detector 44 includes an analog switch 48 operated by the main counter signal IN0 which is fed through a delay circuit 50. One switch 48 output is connected to a capacitor 52 and a second output is connected to capacitor 54 to develop a differential phase signal. A differential amplifier 56 is coupled to the two capacitors and the amplified phase output is connected through a switched capacitor low pass filter 58 to a comparator 60 referenced to V/2 to determine the zero crossing point of the phase signal. A latch 62 has a first section 62A having inputs coupled to the main counter outputs and a second section 62B having inputs coupled to the prescaler outputs. Both latch sections are clocked by the zero crossing signal from the comparator 60 so that the latched output will be a precise measure of the phase angle which is the measure of the encoder angular position.

Figure 6:
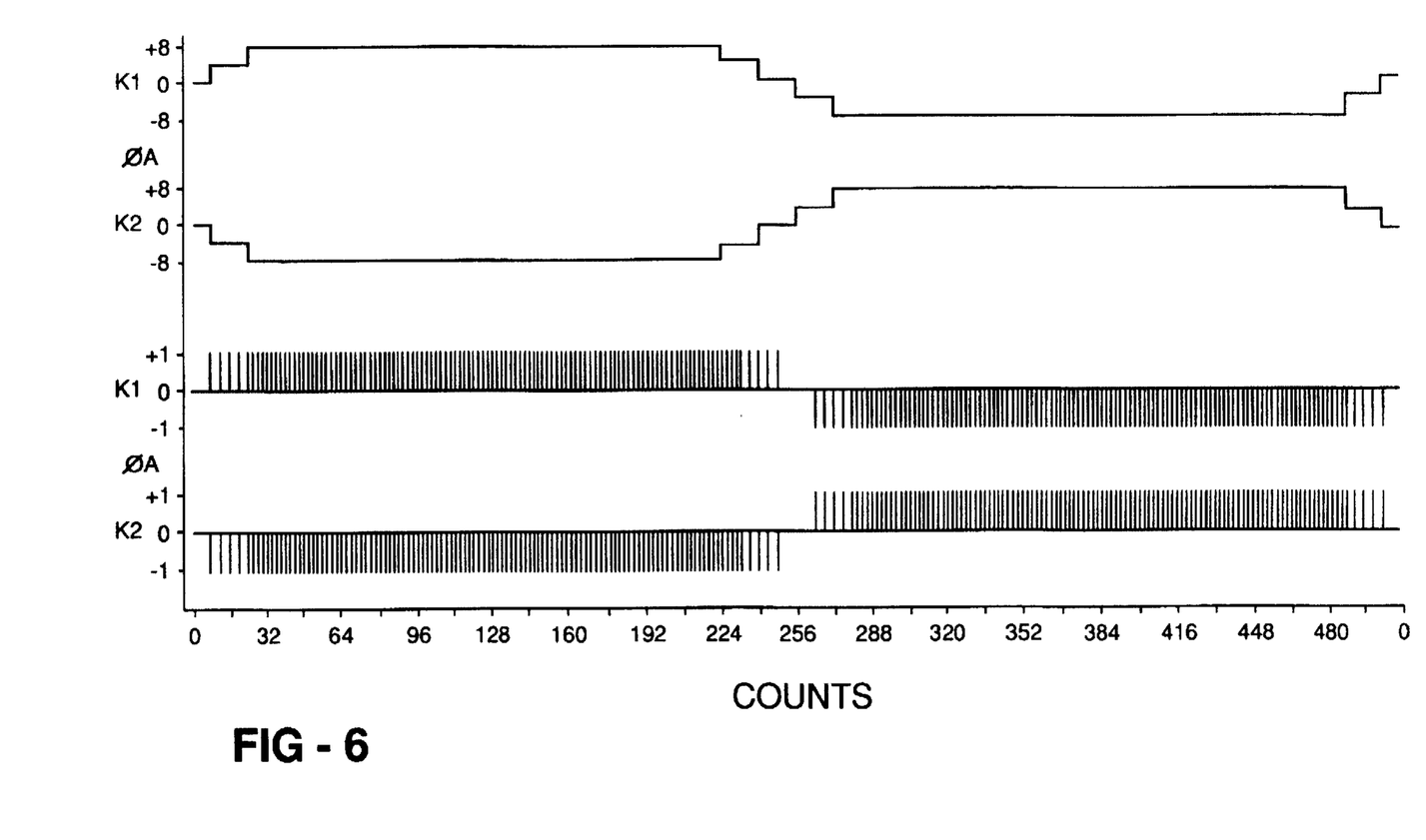
FIG. 6 is a set of current waveforms developed by the circuit of FIG. 4.

The analog switch control input is derived from IN0 and is delayed to guarantee that the analog switch state is held stable when signals ØA–ØH switch. With this arrangement, charge is pumped by the transitions present on the signals ØA–ØH through the sensor capacitors, CA–CH and through the pickup capacitor, CP, to the capacitors 52 and 54. The capacitors 52 and 54 are alternately connected to the pickup capacitor CP by the analog switch 48. It can be seen that 1) rising edges increase the voltage and falling edges decrease the voltage; and 2) similarly, rising and falling edges present on signals ØA–ØH that are inverted in phase with respect to IN0 cause charge to be pumped to and from capacitor 54. This is illustrated for ØA in FIG. 6. The bottom two traces show the current pulses into capacitors 52 and 54 as a result of the transitions on ØA as a function of main counter counts. The top two traces show the number and polarity of current pulses occurring in each eight count interval, an average current. One waveform is the exact negative of the other; the differential nature of these two signals is important for noise rejection. The other seven drive signals generate similar waveforms but with different phase relationships. FIG. 6 does not reflect the reduction of amplitudes occurring when a capacitance CA–CH is less than the maximum value due to partial coupling of a segment with the encoder pattern.

Figure 7:
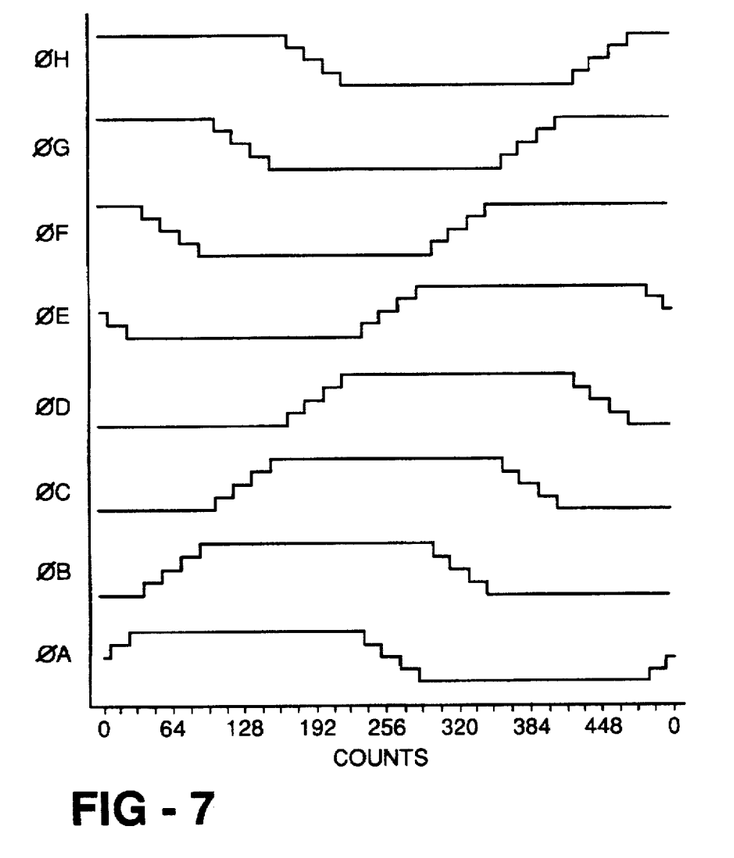
FIG. 7 is a set of current waveforms for the several phases developed by the circuit of FIG. 4.
Figure 8A:
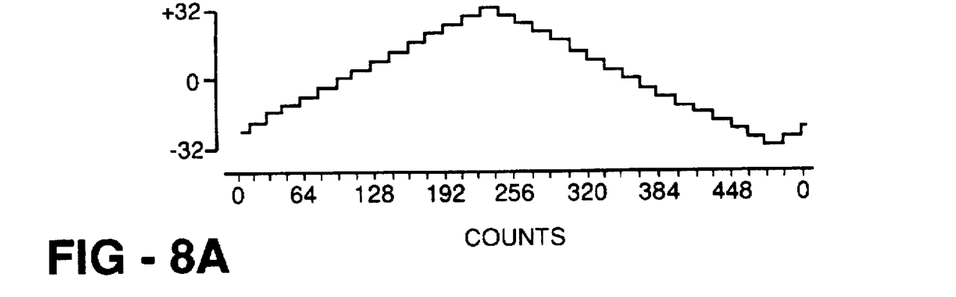
FIGS. 8A–8D are summed current waveforms for certain phases.
Figure 8B:
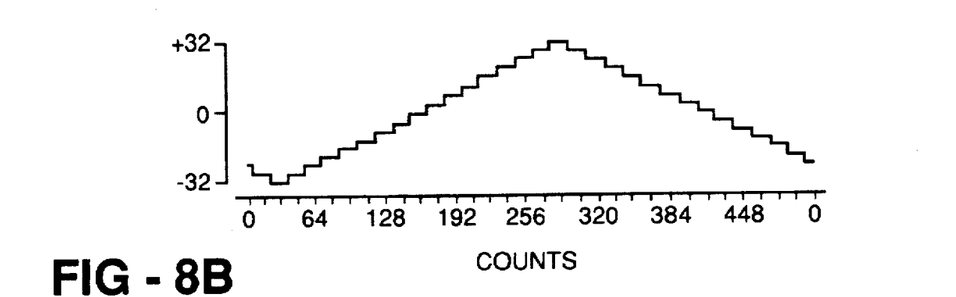
Figure 8C:
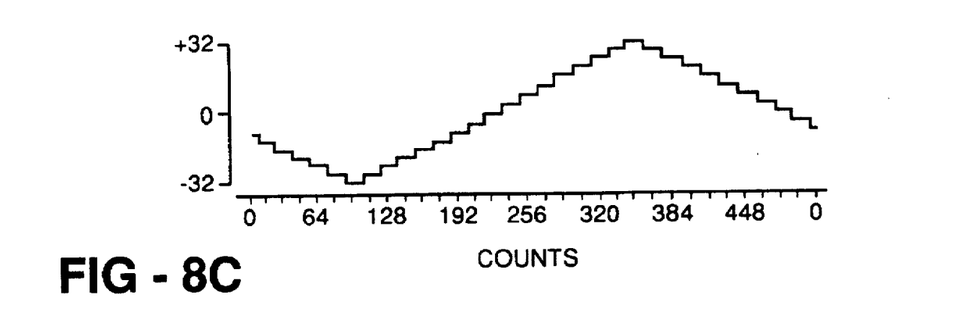
Figure 8D:
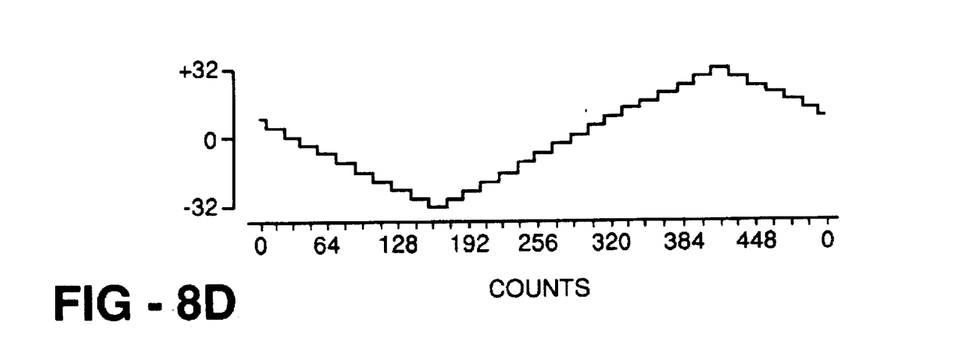
Figure 9:
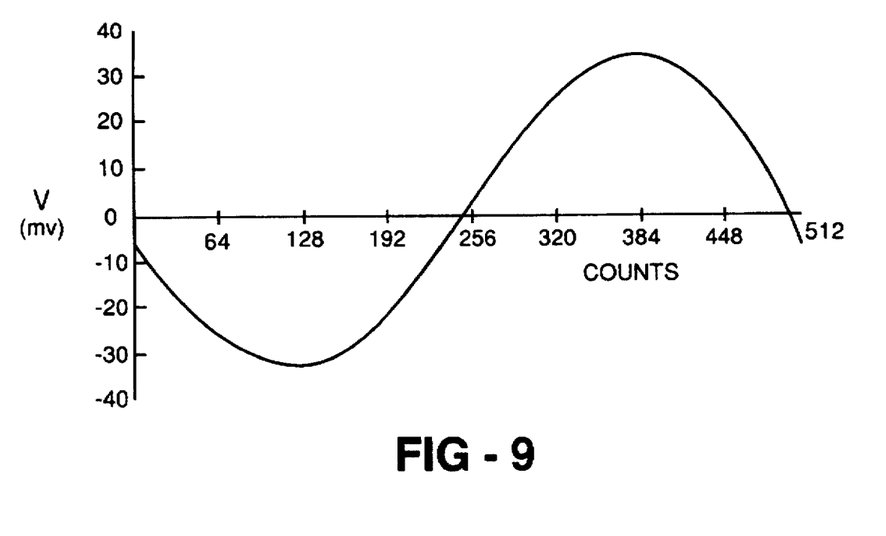
FIG. 9 is a graph of a phase signal developed by the circuit of FIG. 4.

The currents contributed by each of the eight drive signals are summed by the sensor in proportion to their respective capacitors CA–CH. FIG. 7 shows maximum average current for each of the eight drive waveforms for capacitor 52. FIGS. 8A–8D respectively show the summed currents for ØA through ØD (0°), ØB through ØE (45°), ØC through ØF (90°), and ØD through ØG (135°). Intermediate positions are not shown. For each increment of encoder rotation the summed current waveform (and the resulting voltage waveform) is correspondingly shifted linearly. Thus by measuring the phase angle the encoder position is also measured. The capacitor voltage waveform is the integrated capacitor current waveform and is shown in FIG. 9. This is the voltage waveform for the sum of ØA through ØD or 0°. The zero crossing point is measured at the crossing of the decreasing voltage. A phase shift due to the low pass filter causes a small offset of 0 count from 0°. The switched capacitor filter 58 causes the offset to be constant with temperature. Also a switched capacitor filter can be implemented totally in silicon without external components to thereby minimize its cost.

To develop the phase signal, the differential amplifier 56 differentially amplifies the voltage on capacitors 52 and 54. The filter 58 is a second order low pass filter inserted after the amplifier 56 to remove some distortion which is possible due to the encoder crossing between the various drive signal phases. The phase signal is biased to swing about V/2 and is compared to V/2 with the analog comparator 60 to determine the zero crossing point. The output of the comparator 60 is synchronized to the system clock and the main counter is then latched.

Latching the main counter value gives nine bit resolution. Each count of the main counter latch corresponds to 360/512 degrees of rotation. The prescaler counter 36 allows the position of the zero crossing of the phase signal to be discriminated with additional accuracy. Adding prescaler bits increases resolution, but increases the required clock frequency. A binary prescaler with P bits resolves each count of the main counter into $2^P$ prescaler counts. Each count of the prescaler latch then corresponds to $360/(512*2^P)$ degrees of rotation.

In the examples illustrated herein eight segments per cycle and corresponding eight driving waveforms are employed. Other numbers may be used however. It is expected that as few as three segments and driving signals could be used, although with lower resolution.

Additional resolution can be obtained by adding multiple cycles of the drive waveforms to the circuit board and encoder disk patterns. The same sequence of drive waveforms ØA-ØH is repeated more than once around the periphery of the encoder, and the encoder disk pattern is modified to couple to the multiple cycles of the drive signals.

Figures 10, 11, 12:
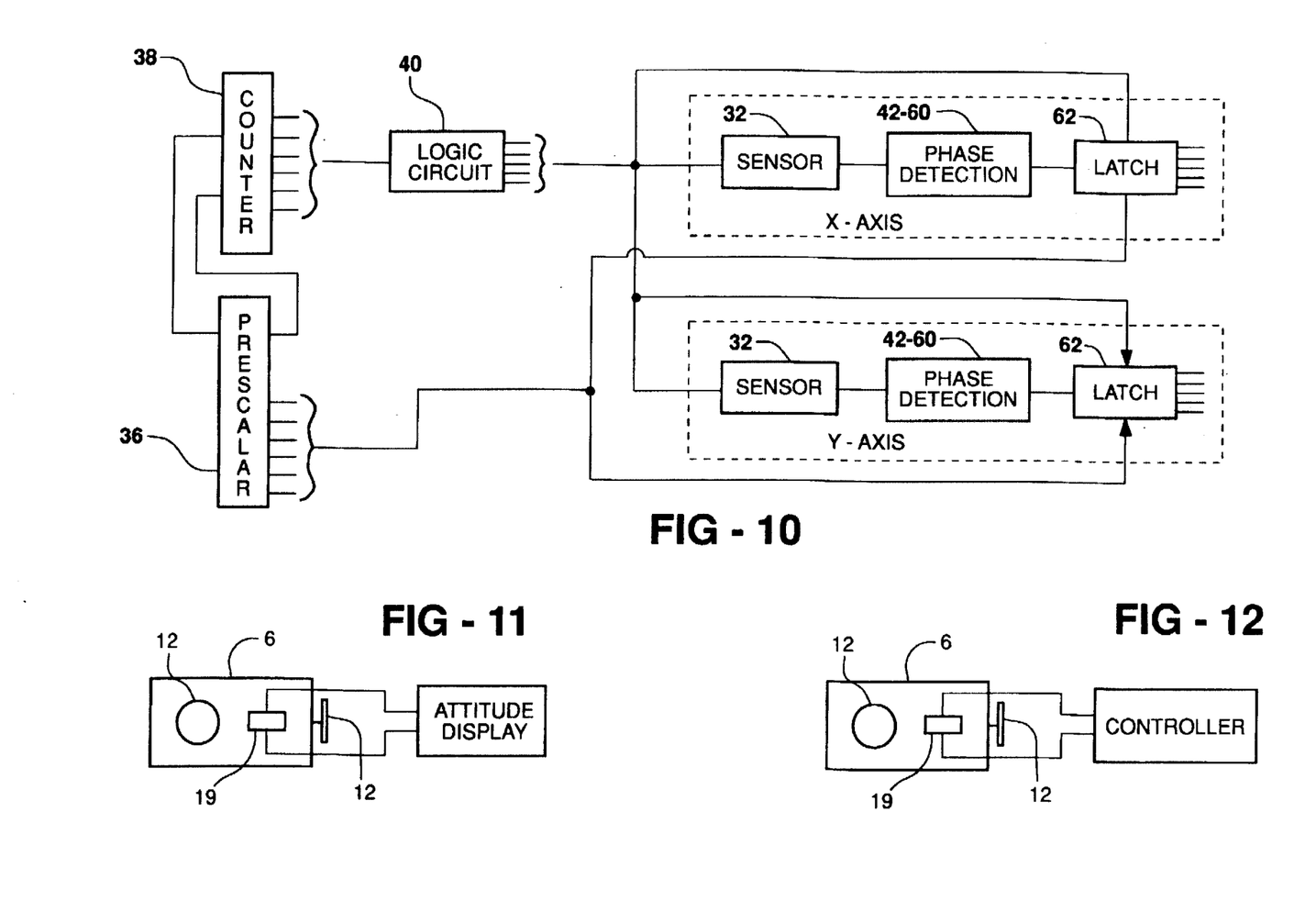

While a single sensor 32 and the associated circuitry is sufficient to obtain a measure of attitude or acceleration with respect to one axis, the dual axis embodiment of FIG. 1a requires some additional circuits. As shown in FIG. 10, the prescalar 36, counter 38 and logic circuit 40 can serve both sensors 32 but each sensor is served by a dedicated phase detection circuit 42-60 and latches 62 to provide separate digital outputs.

Both outputs are used to drive a display as shown in FIG. 11 where a visual output is desired. This is often the case for an attitude sensor used to level a vehicle or to indicate the attitude of an off-the-road vehicle. Where the attitude or acceleration data is to be used to control a system as in a brake controller for a trailer, the circuit output is coupled directly to a controller as shown in FIG. 12.

Assuming 12 bit accuracy, which is well within the working range of the encoder, the sensor can detect changes in either axis of 0.088 degrees. The digital signal is easily transmitted to a remote host system without errors such as power supply noise or line noise typically induced when using analog sensors, and the signal can be used by a computer or other digital circuit without conversion.

The preferred embodiments described herein are not the only configurations within the scope of the invention. For example, the accelerometer rotor does not have to be a disk; it could be a pendant hanging below and rotatable about an axis, and the associated capacitive elements on the circuit board would be arrayed over the range of pendant movement for a particular application.

The embodiments of the invention in which an exclusive property or privilege is claimed are defined as follows:

1. An accelerometer comprising:
   a housing;
   a rotor mounted on the housing for rotation about a nominally horizontal axis;
   the rotor being eccentrically weighted to assume an angular position in response to acceleration of the housing;
   a capacitor plate displaced by the rotor; and
   a capacitive sensor including the capacitor plate displaced by the rotor;
   the capacitive sensor being responsive to the angular position of the rotor for producing an output related to the angular position.

2. The invention as defined in claim 1 wherein:
   the capacitive sensor includes a display and the output is a display parameter related to the angular position.

3. The invention as defined in claim 1 wherein the accelerometer is used as an attitude sensor with the housing being stationary and wherein:
   the capacitive sensor includes a display and the displayed output is the attitude of the housing with respect to the axis.

4. The invention as defined in claim 1 wherein the accelerometer is used as an impact sensor in a motor vehicle and wherein:
   the rotor is angularly displaced by acceleration due to impact perpendicular to the axis, and the output produced by the capacitive sensor is an electrical signal which is a function of vehicle acceleration.

5. The invention as defined in claim 1 wherein the capacitive sensor includes capacitive elements mounted on the housing and coupled with the capacitor plate on the rotor.

6. The invention as defined in claim 1 wherein:
   the rotor comprises a disk concentrically mounted on the axis; and
   the capacitive sensor includes capacitive elements mounted on the housing and coupled with the capacitor plate on the rotor.

7. The invention as defined in claim 1 wherein the capacitive sensor includes:
   capacitive elements mounted on the housing and coupled with the capacitor plate on the rotor; and
   electronic circuitry on the housing for supplying excitation signals to some of the capacitive elements and for analyzing signals from other capacitive elements to determine the angular position.

8. An accelerometer comprising:
   a housing;
   first and second rotors mounted on the housing for rotation about mutually perpendicular, nominally horizontal axes;
   each rotor being eccentrically weighted to assume an angular position in response to acceleration of the housing;
   a capacitor plate displaced by each rotor; and
   a capacitive sensor for each rotor including the respective capacitor plate, displaced by each rotor;
   each capacitive sensor being responsive to the angular position of each corresponding rotor for producing an output related to the angular position.

9. The invention as defined in claim 8 wherein:
   each rotor comprises a disk concentrically mounted on the respective axis; and
   each capacitive sensor includes capacitive elements mounted on the housing and coupled with the capacitor plate on the respective rotor.

10. The invention as defined in claim 8 wherein:
    each capacitive sensor includes a plurality of capacitive segments and a pickup conductor mounted on the housing and coupled with the capacitor plate on the respective rotor; and
    electronic circuitry on the housing having a common signal source for supplying excitation signals to the capacitive segments of each sensor, and separate circuitry for analyzing signals from the respective pickup conductors to determine the angular position of each rotor.

11. The invention as defined in claim 8 wherein:
    each capacitive sensor include a display and the output comprises display parameters related to the angular position.

12. The invention as defined in claim 8 wherein the accelerometer is used as an attitude sensor when horizontal acceleration components are zero and wherein:
    each capacitive sensor includes a display and the displayed output is the attitude of the housing with respect to the axes.

13. The invention as defined in claim 8 wherein the accelerometer is used as an impact sensor in a motor vehicle and wherein:
    each rotor is angularly displaced by acceleration due to impact perpendicular to each axis, and the output produced by each capacitive sensor is an electrical signal which is a function of vehicle acceleration.

* * * * *